United States Patent [19]

Tsuda

[11] Patent Number: 5,950,187
[45] Date of Patent: Sep. 7, 1999

[54] DOCUMENT RETRIEVING APPARATUS AND METHOD THEREOF FOR OUTPUTTING RESULT CORRESPONDING TO HIGHLIGHT LEVEL OF INPUTTED RETRIEVAL KEY

[75] Inventor: Hiroshi Tsuda, Kanagawa, Japan

[73] Assignee: Fujitsu Limited, Kawasaki, Japan

[21] Appl. No.: 08/728,474

[22] Filed: Oct. 10, 1996

[30]     Foreign Application Priority Data

Nov. 30, 1995   [JP]   Japan .................................... 7-312669

[51] Int. Cl.⁶ ....................................................... G06F 17/30
[52] U.S. Cl. ........................................ 707/3; 707/2; 707/5
[58] Field of Search ................................... 707/3, 5, 2, 4, 707/6

[56]                 References Cited

U.S. PATENT DOCUMENTS

| 4,862,390 | 8/1989 | Weiner ........................................... 707/3 |
| 5,713,020 | 1/1998 | Reiter et al. ............................... 707/102 |
| 5,787,411 | 7/1998 | Groff et al. .................................. 707/2 |

FOREIGN PATENT DOCUMENTS

| 62-236746 | 10/1987 | Japan . |
| 1-297768  | 11/1989 | Japan . |
| 2-301825  | 12/1990 | Japan . |
| 4-195518  | 7/1992  | Japan . |
| 5-158401  | 6/1993  | Japan . |

Primary Examiner—Thomas G. Black
Assistant Examiner—Frantz Coby
Attorney, Agent, or Firm—Armstrong, Westerman, Hattori, McLeland, & Naughton

[57]                 ABSTRACT

A user inputs to a document retrieving apparatus a retrieval string whose priority level is represented by using multiple of highlight levels, such as a degree of a font size and the like. A document retrieving apparatus retrieves a document including the retrieval string from a database and displays the retrieval string included in the retrieval result on a screen at the same highlight level as that at a time of inputting. In this way, the strings having different priority levels within the document are displayed at highlight levels different from each other. It is possible to specify a new retrieval string within the document of the retrieval result to thereby carry out a re-retrieval.

21 Claims, 14 Drawing Sheets

DOCUMENT RETRIEVING APPARATUS AND METHOD THEREOF FOR OUTPUTTING RESULT CORRESPONDING TO HIGHLIGHT LEVEL OF INPUTTED RETRIEVAL KEY

BACKGROUND OF THE INVENTION

1. Field of the Invention

The present invention relates to a document retrieving apparatus and a method thereof for inputting a specified character string that becomes a retrieval key and displaying a retrieval result, in an information processing system for retrieving a document including a specified character string from a database.

2. Description of the Related Art

In the present age in which computer-readable documents are increasing, a system is required which can easily retrieve documents having a high relevance level to a given key word through a communication network and the like.

In a conventional document retrieving apparatus, the following systems (1), (2), (3) and (4) are designed as mechanisms for retrieving a document having a high relevance level to given keywords.

(1) Retrieving System for Inputting Any Number of Free Terms (Character Strings) or Logical Expressions.

A user specifies an arbitrary number of retrieval character strings or a logical expression therebetween. The system retrieves a document in which a given character string is included or a document with which a given logical expression is satisfied. The relevance levels of obtained documents are calculated by using statistical information in a database, and the documents are displayed in order of their respective relevance levels. There are systems, such as WAIS (a retrieving system designed by the Wais company in the U.S.A.), TARGET (a retrieving system designed by the Dialog company in the U.S.A.) and the like.

For example, in WAIS, the relevance level of the document is calculated from the following four weight elements. However, the actual formula is not published.

(a) Word Weight: This is [weight] added in terms of the occurrence of a retrieval word in a document. The highest word weight is given to a word occurring in a headline of the document. The second highest word weight is given to the word where all characters or the first character are capital letters. The least word weight is given in a case of a word occurring only in text, except for a title and the like.

(b) Term Weight: A word occurring frequently in a document has lower term weight than a word occurring rarely.

(c) Proximity Relationship: Higher weight is given to different retrieval words that occur adjacent to each other within a document.

(d) Word Density: This is a ratio of an occurrence number of a retrieval word to a document size.

The following elements are used in a case of a relevance level judging algorithm used in TARGET, and 50 titles in order of relevance level are displayed as a retrieval result. However, the actual equation of the relevance level is not published.

(e) Number of Respective Retrieval Phrases Included in Record (f) Retrieval Phrase Occurring In Record (g) Distance between Different Retrieval Phrases (h) Number of Retrieval Phrases in Database (2) Retrieving System in Which the User Specifies a Priority Level of Retrieval Phrase, in Addition to Above Mentioned System (1).

A user allocates a priority level, being a real number that mainly belongs to a period [0,1], to arbitrary retrieval character strings, or specifies a logical expression to determine their priority levels. This system is characterized in that the relevance level is calculated by using information specified by the user in addition to the above mentioned system (1). This has been studied, as a so-called weighted Boolean or extended Boolean system.

As a weighted Boolean system, the MMM (Mixed Min and Max) model was proposed by Fox and Sharat (Fox, E. A., and S. Sharat. 1986. "A Comparison of Two Methods for Soft Boolean Interpretation in Information Retrieval." Technical Report TR-86-1, Virginia Tech, Department of Computer Science). In the MMM model, a priority level of a character string wi (i=1, 2, . . . ) is di, a priority level of (w1 AND w2) is min (d1, d2), and a priority level of (w1 OR w2) is max (d1, d2). For the document including the character strings w1 and w2, the priority level is calculated by using the specified expression. Then, it is examined to what degree the document satisfies the logical expression. It is considered that the larger the calculated value, the higher the relevance level.

(3) Retrieving System for Inputting a Sentence and Selecting a Character String Similar Thereto.

A text, which contains sentences, not merely a character string, is assumed to be an input, and a document in relation thereto is retrieved from a database. A keyword is suitably extracted from the inputted text. Then, a document having a characteristic of a similar keyword is retrieved. The basic operation is the same as the above mentioned systems (1) and (2).

(4) System for Highlighting and Outputting a Retrieval Character String.

A retrieval character string is distinguished from a normal character (basic sentence) by highlighting the retrieval character string by means of a bold character, an underline, or putting the retrieval character string in parentheses. Since it is enough that the retrieval character string can be distinguished from the normal characters, the highlight level of the retrieval character string is set at only one level. Examples of patent applications with respect to these outputting processes, are [Character String Highlight Outputting Method] (Japanese Patent Application No.61-080035 and Japanese Patent Application Laying Open (KOKAI) No.62-236746), [Document Processing Apparatus] (Japanese Patent Application No.63-127103 and Japanese Patent Laying Open (KOKAI) No.01-297768), [Data Outputting Apparatus (Japanese Patent Application No.02-328160 and Japanese Patent Laying Open (KOKAI) No.04-195518) and the like.

However, there are the following problems in the conventional retrieval systems as mentioned above.

In the above mentioned system (1), the priority level is not added to the retrieval word inputted by a user. Thus, in a case of inputting more than one retrieval word, they are all processed at the same level. For this reason, there is little information available for use at the time of calculating the relevance level of a document of a retrieved candidate, and thereby noise is likely to be induced into the retrieval result (the precision is lowered). Here, the noise induced in the retrieval result means unnecessary documents which the user did not intend to retrieve. For example, a document, in which unimportant words among the inputted retrieval words are included, may be noise in the retrieval results.

In a case of the above mentioned system (2), the fact that the user specifies the importance level by using a real number, such as 0.2 and the like, brings about problems that it takes effort to input and that it is difficult to understand intuitively.

In a case of the above mentioned system (3), at the time of extracting a word from a Japanese input text, it is necessary to carry out an analyzing process for determining individual words, which is different from English. This is because, in a Japanese text, a space is not inserted between words, which is different from an English sentence, and each word's boundary is not evident. If a position of an individual word is mistaken, a document which is not in relation to the input text may be retrieved, resulting in the possibility that noise is induced in the retrieval result.

In a case of inputting by adding the priority level to a retrieval word, it is desired to display also the retrieval word included in the retrieval result corresponding to the priority level thereof. However, in the highlight level having just one level in the character string, such as the above mentioned system (4), it is impossible to distinguish between a plurality of character strings in which the priority levels are different, and thereby the number of levels implemented by the system (4) is insufficient.

SUMMARY OF THE INVENTION

It is therefore an object of the present invention to provide a document retrieving apparatus and a method thereof, wherein a user can intuitively input a priority level of a retrieval character string in order to retrieve a document including a given character string from a data base, and wherein the retrieval result is outputted on the basis of the inputted priority level.

The document retrieving apparatus in accordance with the present invention is installed in an information processing system for retrieving a document from a database, with a specified character string as a retrieval key, and is provided with an input unit, a retrieving unit, a relevance judging unit, an output unit and a feedback unit.

The input unit visibly highlights and inputs a retrieval character string. The retrieving unit retrieves the documents in which the inputted retrieval character string is included from the database. The output unit highlights the retrieval character string included in the retrieved documents at a highlight level corresponding to that at the time of inputting, and outputs it.

The input unit illustrates a degree of the highlight level of the retrieval character string, for example, by means of a character string highlight, such as a degree of a font size and the like. Illustration of the highlight level can be simply carried out by pointing to the character string, and clicking a button, for example, by means of a GUI (graphical user interface) using a pointing device, such as a mouse and the like.

The output unit highlights the retrieval character string within the retrieved document, based on the highlight level corresponding to specification at the time of inputting. As a result, a user can easily determine the relation between the document in the retrieval result and the retrieval character string.

If preparing multiple highlight levels in advance, it is possible to specify one of the multiple levels of highlights at the time of inputting, and thereby it is possible to illustrate multiple levels of retrieval character strings in the retrieval result.

Further, the relevance judging unit makes the highlight level of the retrieval character string included in the retrieved document correspond to a priority level, and uses the priority level thereof to thereby judge the relevance level between the retrieval character string and the retrieved document.

Accordingly, the highlight level of the retrieval character string represents the priority level thereof, and the highlight level specified at the time of inputting is reflected in the relevance level of the retrieved document. As a result, it is possible to control the relevance level of the retrieved document by changing the highlight level.

The feedback unit feeds back information included in the outputted retrieval result to the input unit.

In the retrieval result outputted by the output unit, output information is fed back to the input unit by again specifying the retrieval character string and the highlight level thereof, for example, by means of the GUI similar to that at time of inputting. Accordingly, it is possible to carry out a re-retrieval by specifying a new retrieval character string within the document of the retrieval result or changing the highlight level of the existing retrieval character string.

As mentioned above, according to the present invention, a user can specify the highlight level of the character string on the basis of operating an intuitive GUI and easily retrieve a document having a high relevance level to an input character string. Even by briefly checking an outputted retrieval result without reading in detail, its importance can be recognized to some degree. The present invention can be used as an interface for a weighted Boolean retrieval or as a speed-reading support tool for documents.

Further objects and advantages of the present invention will be apparent from the following description of the preferred embodiments of the invention as illustrated in the accompanying drawings.

DESCRIPTION OF THE PREFERRED EMBODIMENTS

Embodiments in accordance with the present invention will be explained hereinafter in detail with reference to the drawings.

Figure 1:
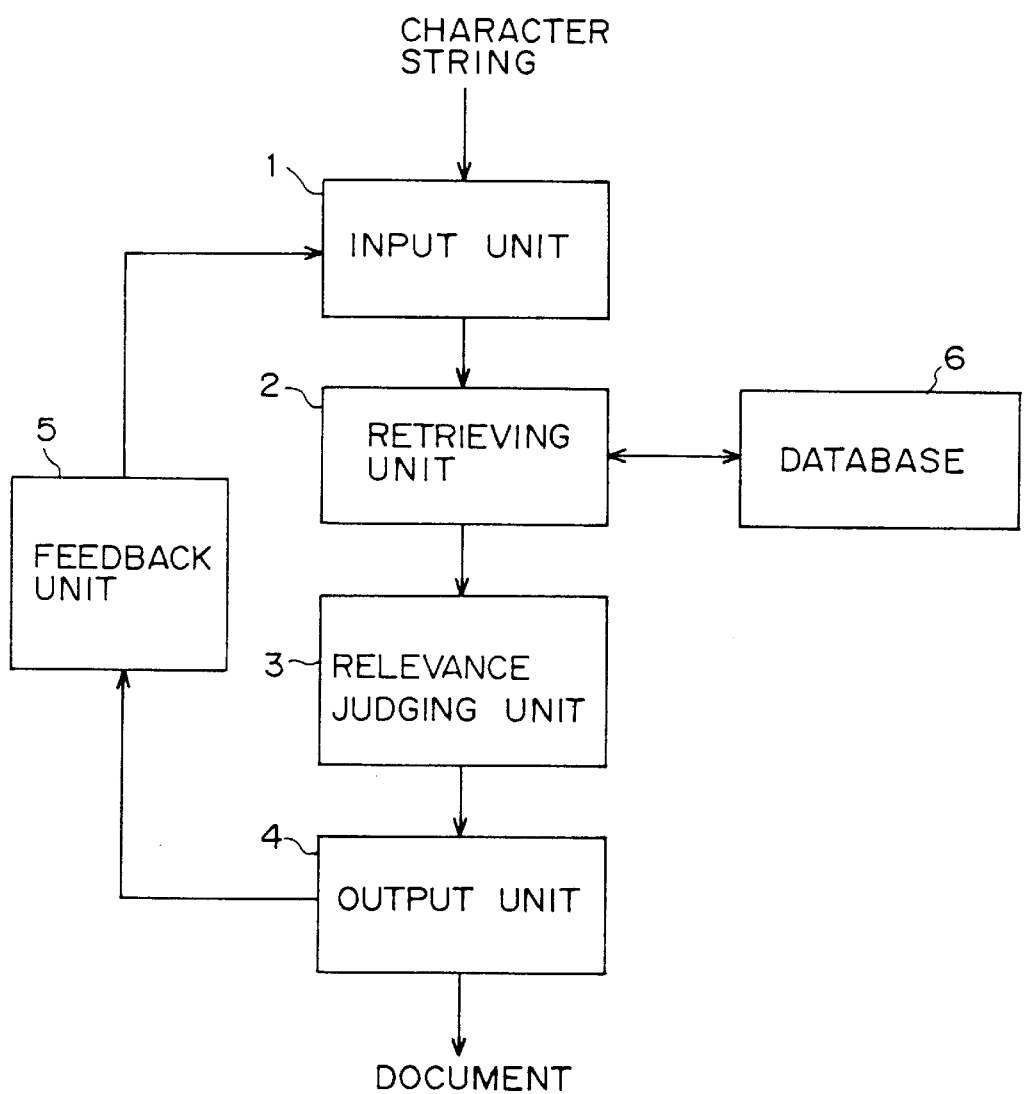
FIG. 1 is a block diagram of a document retrieving apparatus in accordance with the present invention.

FIG. 1 is a principle view of a document retrieving apparatus in accordance with the present invention. The document retrieving apparatus shown in FIG. 1 is disposed in an information processing system for retrieving a document from a database 6 with a specified character string as a retrieval key, and is provided with an input unit 1, a retrieving unit 2, a relevance judging unit 3, an output unit 4 and a feedback unit 5.

The input unit 1 visibly highlights and inputs a retrieval character string. The retrieving unit 2 retrieves, from the database 6, documents in which the inputted retrieval character string is included.

The output unit 4 highlights the retrieval character string included in the retrieved documents at a highlight level corresponding to that specified at the time of inputting, and outputs it.

The input unit 1 illustrates the degree of the highlight level of the retrieval character string, for example, by means of a character string highlight, such as a degree of a font size and the like. The illustration of the highlight level can be easily carried out by pointing to the character string, and clicking a button by using a GUI (graphical user interface) in which a pointing device is utilized.

The output unit 4 highlights the retrieval character string within the retrieved documents, based on the highlight level corresponding to the specification at the time of inputting. Accordingly, a user can easily determine the relation between the document of the retrieval result and the retrieval character string.

If preparing multiple highlight levels in advance, it is possible to specify one of the multiple levels of highlights at the time of inputting, and it is also possible to illustrate many levels of retrieval character strings in the retrieval result.

The relevance judging unit 3 makes the highlight level of the retrieval character string included in the retrieved documents correspond to a priority level, and uses the priority level thereof to judge the relation between the retrieval character string and the retrieved documents.

Accordingly, the highlight level of the retrieval character string represents the priority level thereof, and thereby the highlight level specified at the time of inputting is reflected in the relevance level of the retrieved documents. As a result, it is possible to change the highlight level to thereby control the relevance level of the documents to be retrieved.

The feedback unit 5 feeds back information included in the outputted retrieval result to the input unit 1.

In the retrieval result outputted by the output unit 4, output information is fed back to the input unit 1, for example, by again specifying a retrieval character string and a highlight level thereof by means of the GUI, similar to that at the time of inputting. As a result, it is possible to perform the re-retrieval by specifying a new retrieval character string within the documents of the first retrieval result, or by changing the highlight level of the existing retrieval character string.

For example, the input unit 1 in FIG. 1 corresponds to an input section 11 and a feedback specifying section 12 in FIG. 2, explained below. The retrieving unit 2 corresponds to a character string retrieving section 15. The relevance judging unit 3 corresponds to a relevance level judging section 14. The output unit 4 corresponds to an output section 13. The feedback unit 5 corresponds to a feedback specifying section 12.

Figure 2:
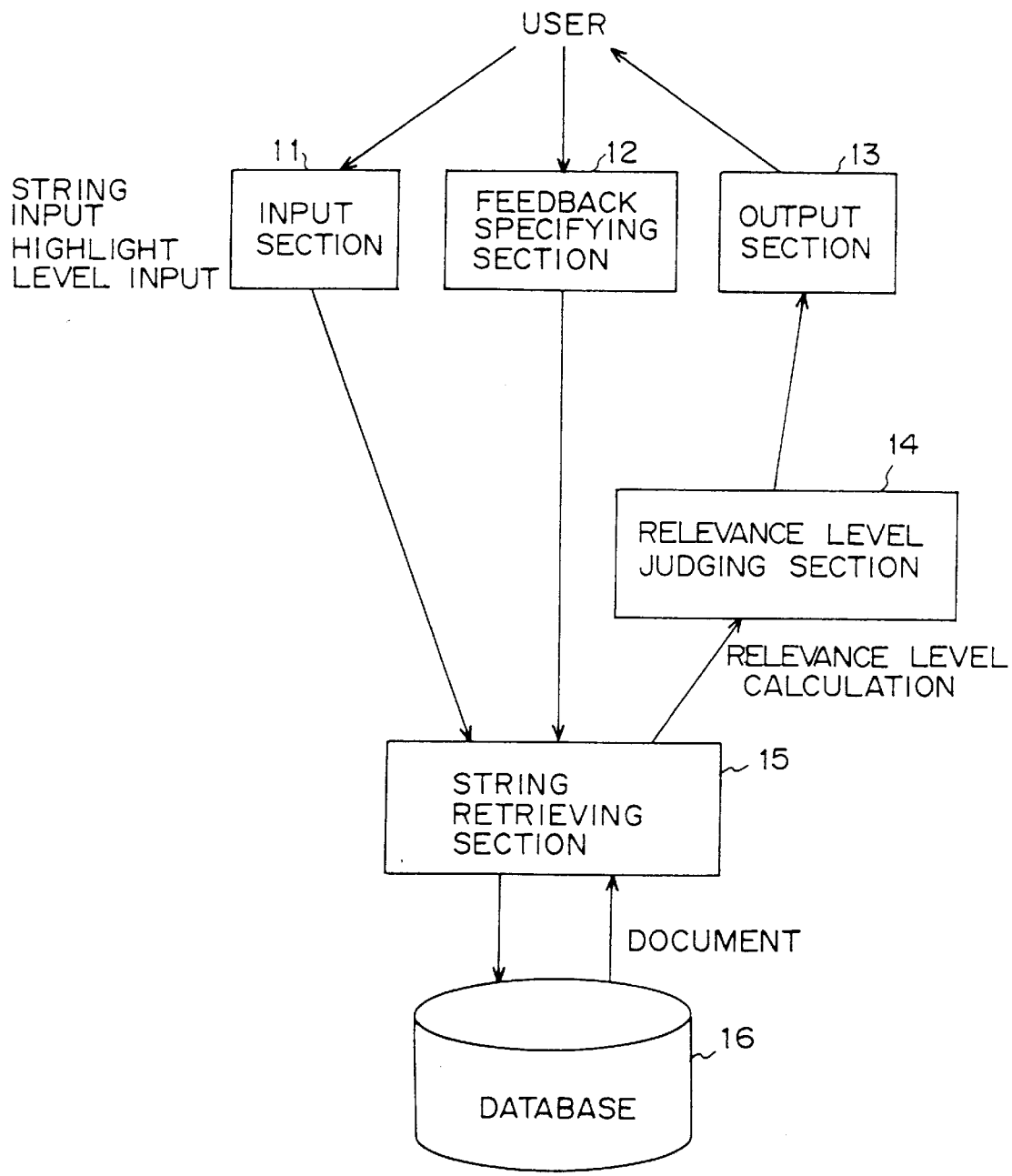
FIG. 2 is a block diagram of a document retrieving apparatus.

FIG. 2 is a block diagram of a document retrieving apparatus of an embodiment according to the principle shown in FIG. 1. The document retrieving apparatus in FIG. 2 is implemented in an information process apparatus, and is provided with the input section 11, the feedback specifying section 12, the output section 13, the relevance level judging section 14, the character string retrieving section 15 and a database 16. Next, a flow of a process in this document retrieving apparatus will be summarized.

At first, a user inputs a retrieval character string and a highlight level thereof to the input section 11 by using a keyboard and a pointing device. The inputted information is sent to the character string retrieving section 15. The character string retrieving section 15 selects documents, in which at least one retrieval character string is included, from the database 16.

Next, the documents obtained as a retrieval result are sent to the relevance level judging section 14. The relevance level judging section 14 uses a priority level corresponding to the highlight level of the retrieval character string inputted by the user to thereby calculate relevance levels of the documents. The relevance level judging section 14 sorts the documents in an order of decreasing calculated relevance level, and sends the sorted result to the output section 13.

The output section 13 displays on a display a certain number of documents that are the highest level documents in order of relevance level from the sorted result. At this time, the retrieval character string included in the document is highlighted on the basis of the highlight level. The user can set a new retrieval character string in the feedback specifying section 12 and make the character string retrieving section 15 perform a re-retrieval, by specifying the character string in the displayed document to thereby change the highlight level.

Figure 3:
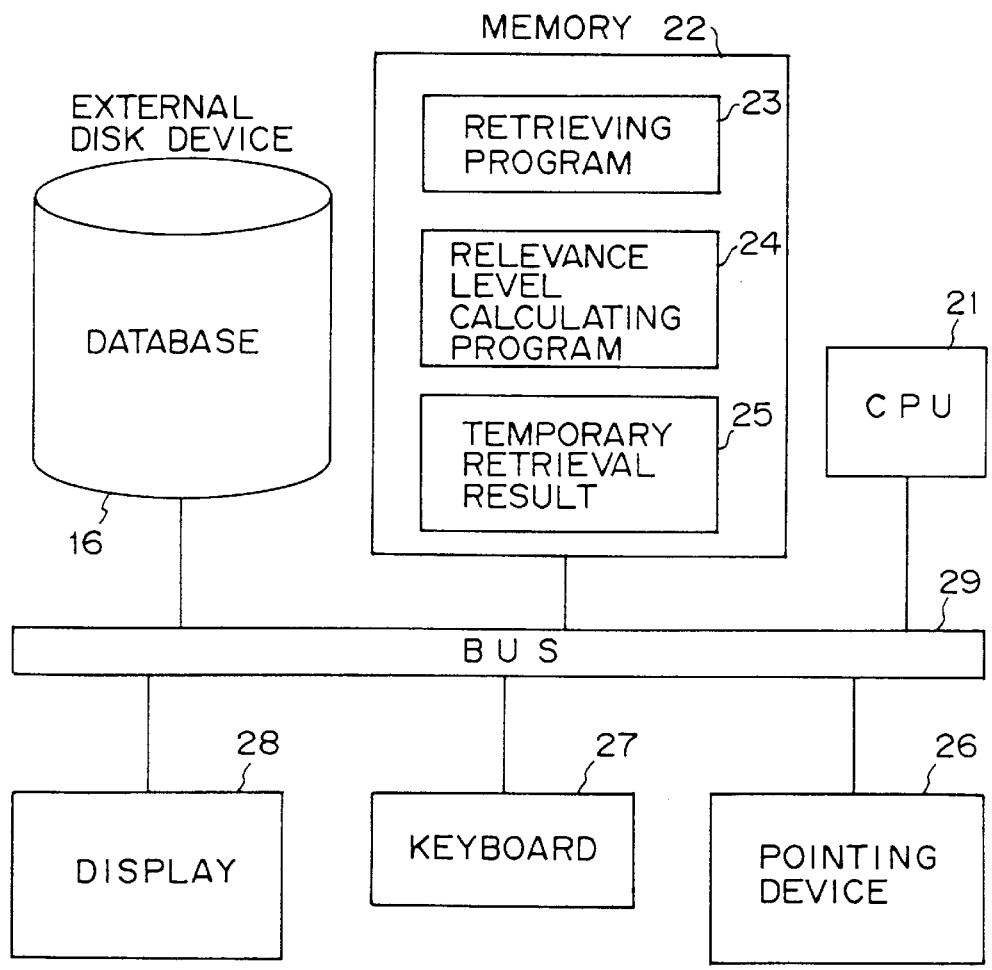
FIG. 3 is a block diagram of an information processing apparatus.

FIG. 3 is a block diagram of an information processing apparatus used as the document retrieving apparatus. The information processing apparatus in FIG. 3 comprises a database 16, a CPU (Central Processing Unit) 21, a memory 22, a pointing device 26, a keyboard 27, a display 28 and a bus 29 which links them together. The database is not always required to be mounted within the information processing apparatus, and is allowable to be mounted on an external disk device. As a disk device, it is possible to use any disk, such as a magnetic disk, an optical disk, a magneto-optic disk and the like.

A retrieval program 23 and a relevance level calculation program 24 are stored in advance in the memory 22, and they are executed by the CPU 21. The CPU 21 executes the retrieval program 23 to implement the functions of the input section 11, the feedback specifying section 12, the output section 13 and the character string retrieving section 15, and executes the relevance level calculation program 24 to implement the function of the relevance level judging section 14. The CPU 21 stores a temporary retrieval result 25 in the memory 22, and uses it to carry out the process.

The keyboard 27 is mainly used for inputting the retrieval character string, and the pointing device 26 is mainly used for specifying the highlight level of the character string.

As the highlight level of the character string used for the input and output of the document retrieving apparatus, for example, a size of a character font is considered. The setting in which the larger a font size, the higher the highlight level, is a very user-friendly interface, that is common not only in Japanese but also in foreign languages. If employing such a highlight level, it is easy to use in practicce in a case of a system running under an OS (operating system), such as X-Window, Windows and the like, in which TrueType fonts (vector fonts) can be processed. The vector font means a font that can be enlarged and reduced to any size.

As the type of highlight level, it is allowable to use other attributes, such as a color of the character (the brighter the color, the higher the highlight level), a style of the character and the like. However, since these character attributes are limited depending on a type of display device and the kind of language used, they lack generalization. Accordingly, in this embodiment, the highlight level is specified on the basis of a degree of the font size.

Figure 4:
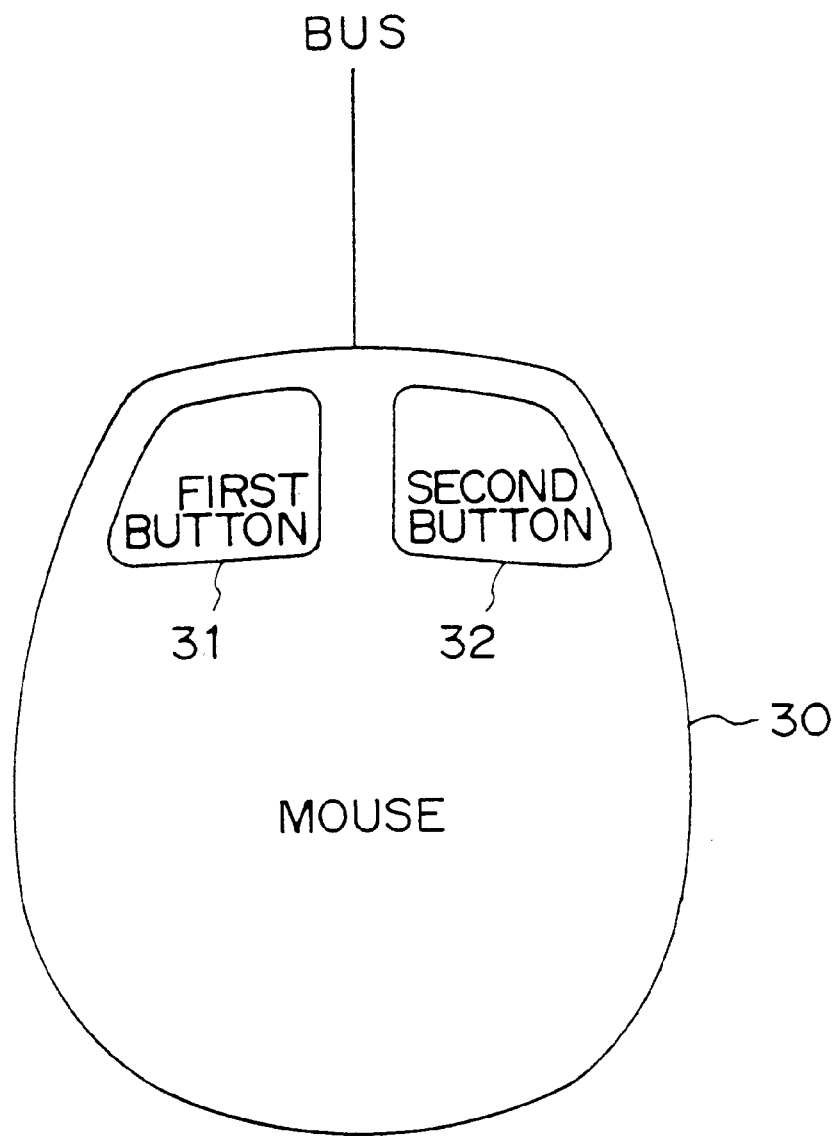
FIG. 4 is a view showing an example of a pointing device.

A pointing device 26, such as a mouse and the like, having two or more buttons, is used as the input device for specifying the highlight level. FIG. 4 shows a mouse that is one example of the pointing device 26. The mouse in FIG. 4 comprises a first button 31 and a second button 32. The user inputs the retrieval character string (retrieval word) from the keyboard 27, and then moves a mouse 30 onto one character string, and clicks the first button 31 to thereby enlarge the font size of the character string and clicks the second button 32 to thereby reduce the font size.

Figure 5:
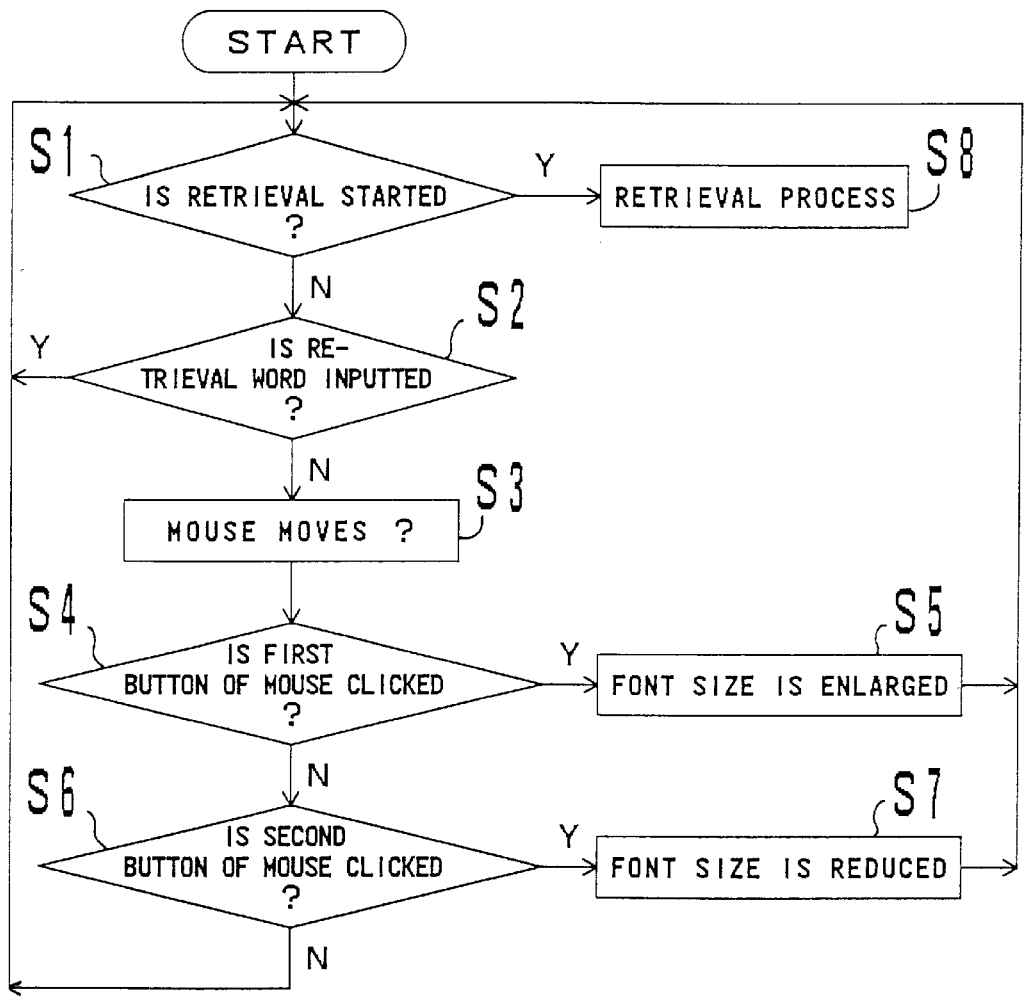
FIG. 5 is a flow chart of an input process.

FIG. 5 is a flow chart of an input process performed by the input section 11. When the process is started in FIG. 5, the input section 11 at first judges whether or not the user instructs a retrieval start by operating the keyboard 27 or the mouse 30 (step S1). Unless the retrieval start is instructed, the input section 11 next judges whether or not the retrieval word is inputted from the keyboard 27 (step S2). In a case that the retrieval word is inputted, the input section 11 returns to the process at step S1.

Figure 6:
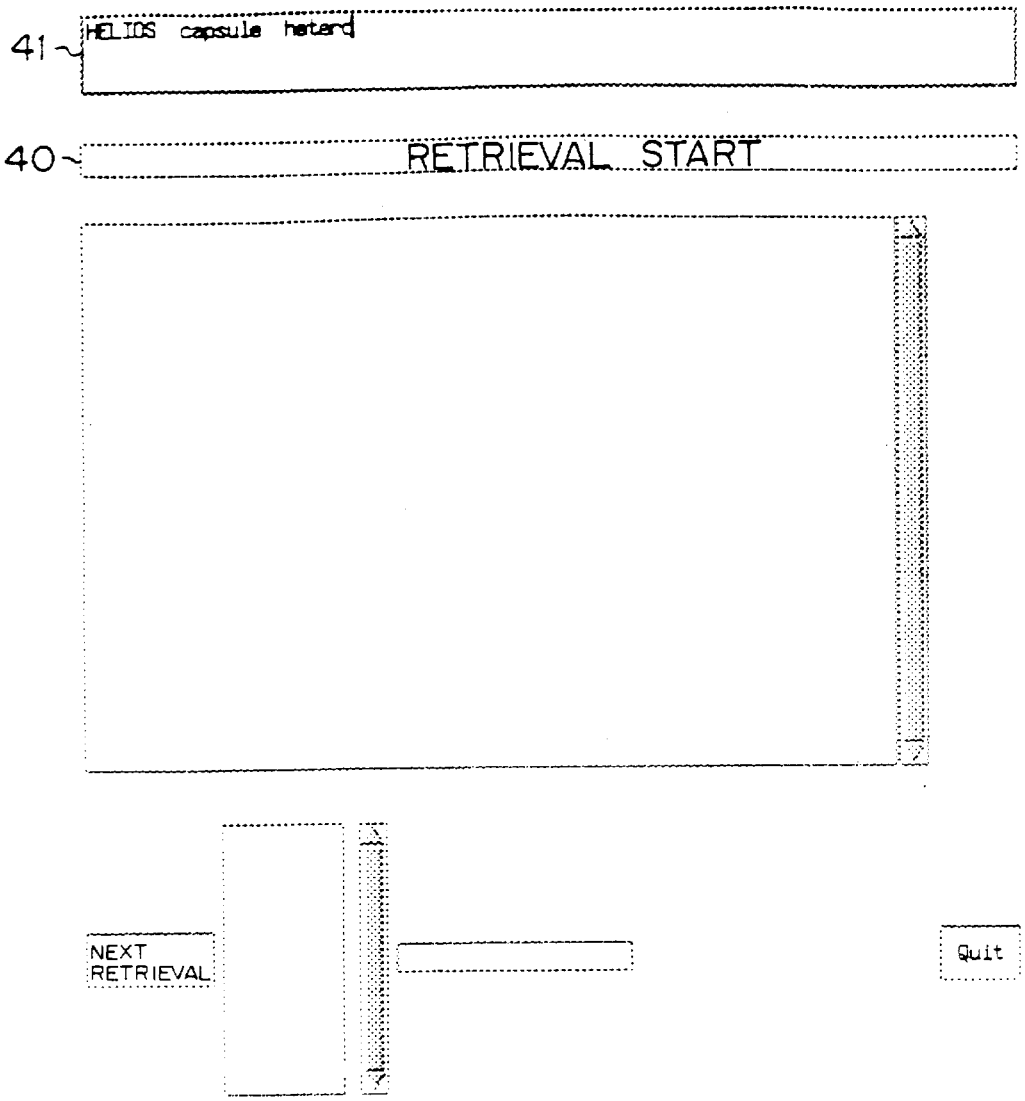
FIG. 6 is a view showing an inputted character string.

FIG. 6 shows an example of a retrieval character string inputted on the display 28. In FIG. 6, the three retrieval words "HELIOS", "capsule" and "hetero" are inputted in a retrieval character string input window 41.

Next, at a time of knowing that the mouse 30 has moved while a retrieval word has not been inputted (step S3), the input section 11 judges whether or not the first button 31 of the mouse 30 is clicked (step S4). In a case that the first button 31 is clicked on a certain retrieval word, the font size of the word thereof is enlarged (step S5), and the processes on and after step 1 are repeated. At step S5, the font size may be suitably enlarged according to a number of clicks of the first button 31 or a length of time for which the first button 31 is pushed.

Next, the input section 11 judges whether or not the second button 32 is clicked (step S6). In a case that the second button 32 is clicked on a certain retrieval word, the font size of the word thereof is reduced (step S7), and the processes on and after step S1 are repeated. Also at step S7, the font size may be suitably reduced according to a number of clicks of the second button 32 or a length of time for which the second button 32 is pushed.

In a case that neither the first button 31 and nor the second button 32 are clicked, the input section 11 returns to the process at step S1. When the retrieval start is instructed at step S1, the document retrieving apparatus carries out the retrieving process (step S8).

Figure 7:
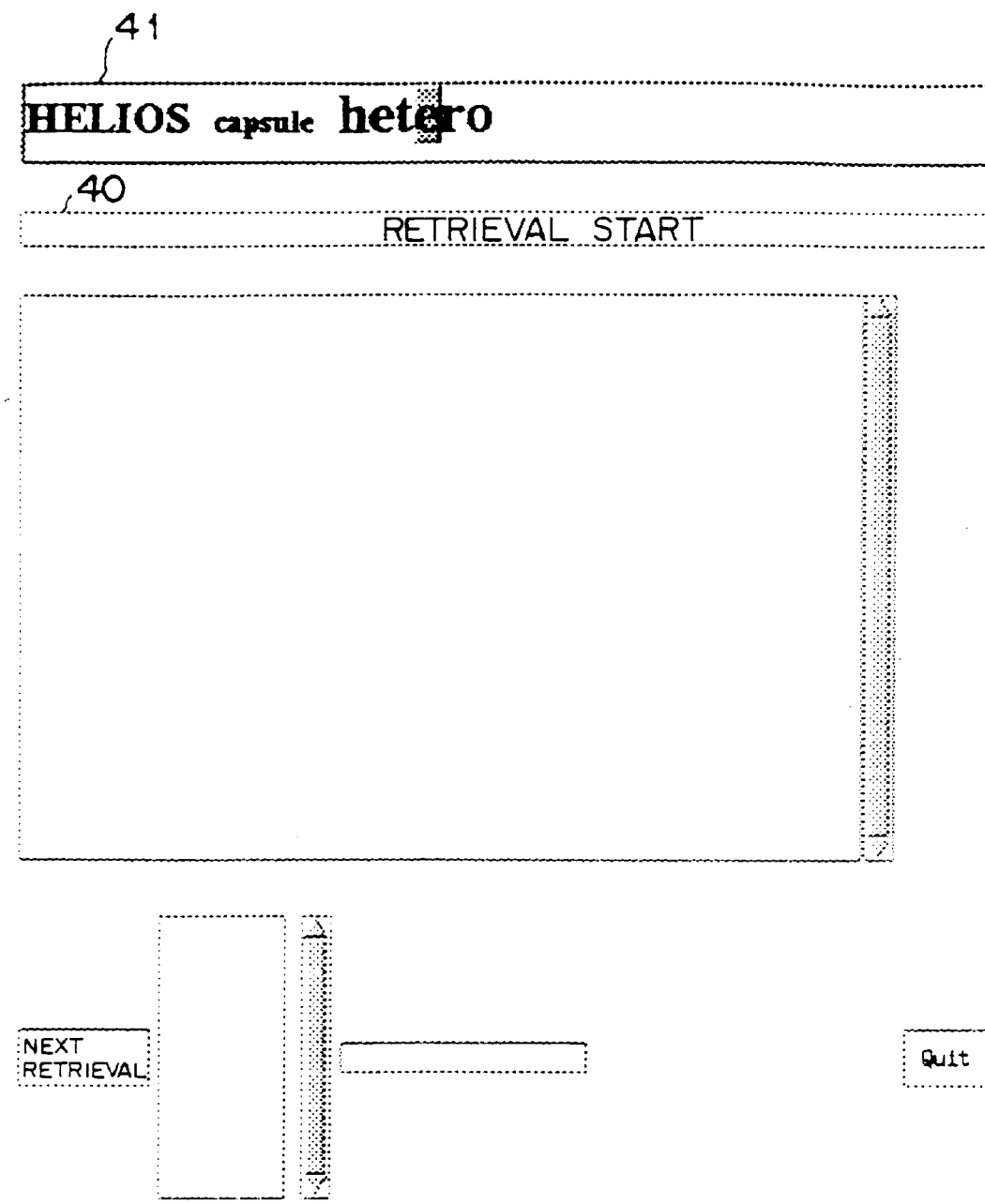
FIG. 7 is a view showing a character string whose highlight level is specified.

FIG. 7 shows the retrieval character string whose highlight level is specified as mentioned above. In a retrieval character string input window 41 in FIG. 7, it is understood that the three retrieval words are all enlarged in font size and thereby highlighted as compared with the previous fonts. It is represented that "HELIOS" and "hetero" are larger in font size than "capsule", and are higher in highlight level.

As mentioned above, the font size of the retrieval character string is changed by the click operation of the mouse 30, and the degree of the highlight level is illustrated according to the degree of the font size. The user can select the character string by means of the mouse 30 and click a button to thereby specify the highlight level easily. In FIG. 7, when the user clicks an operation button 40 on which "Retrieval Start" is indicated, the retrieval process is started on the basis of these retrieval words.

As a method of specifying the character string, it is allowable to use a cursor of the keyboard 27 in addition to the mouse 30, and also allowable to use a trackball, an input pen and the like, which are other pointing devices. It is not always necessary that the degree of the highlight level is illustrated according to the degree of the font size. It is allowable to illustrate by using other methods, such as change of the color of the character and the style of the character.

Figure 8:
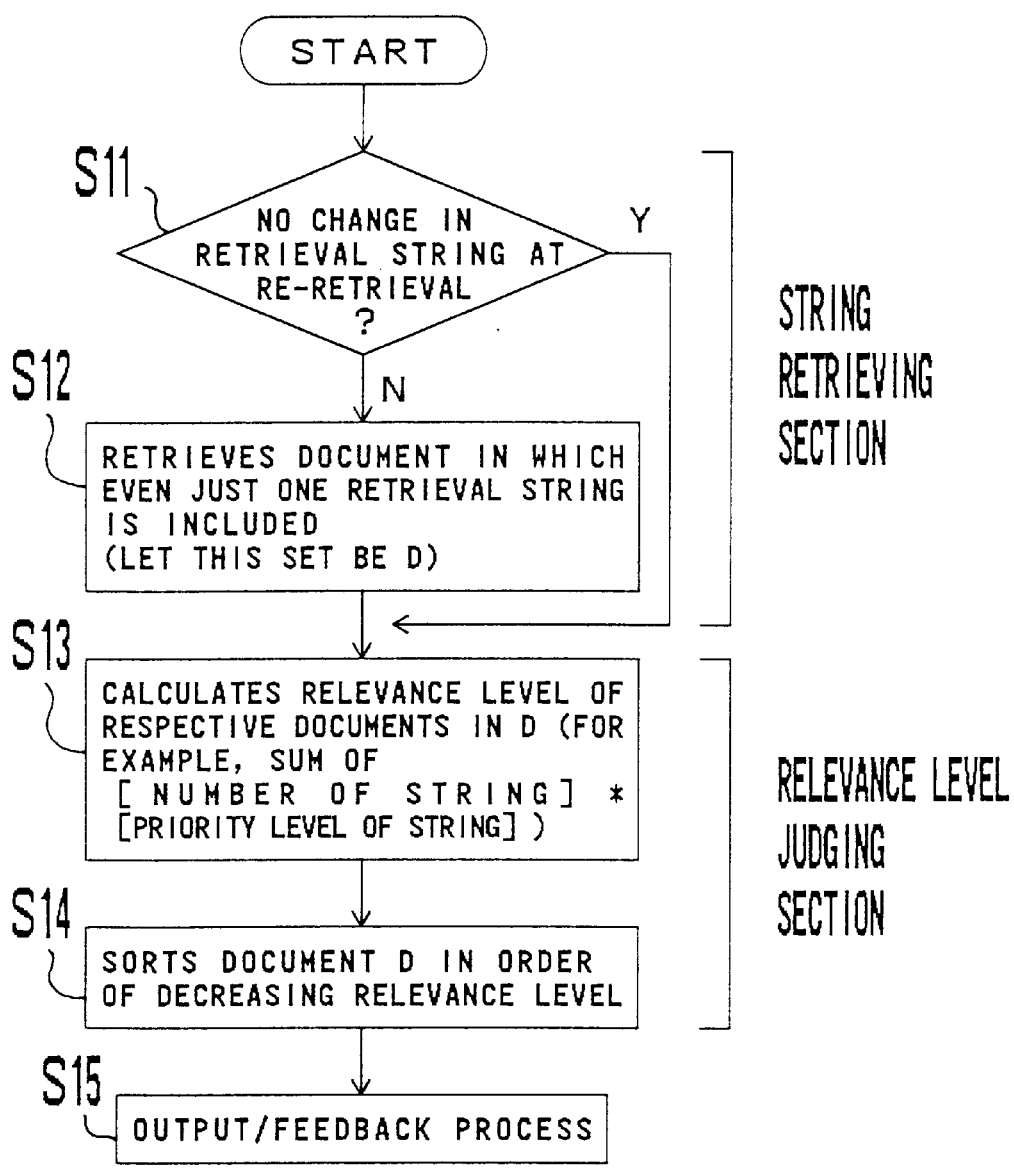
FIG. 8 is a flow chart of a retrieving process.

FIG. 8 is a flow chart of the retrieval process at step S8, by means of the character string retrieving section 15 and the relevance level judging section 14. When the process is started in FIG. 8, the character string retrieving section 15 at first examines whether or not an instructed retrieval process is a re-retrieval including the same retrieval character string as the previous case, and if there is a change in the retrieval character string (step S11). In a case of the re-retrieval associated with a new retrieval or a change of a retrieval character string, the character string retrieving section 15 retrieves from database 16 documents in which even just one specified retrieval character string is included, and defines a set of these documents as D (step S12).

Next, the relevance level judging section 14 uses the highlight level of the retrieval character string to thereby calculate the relevance levels in respective documents within the set D (step S13), and sorts them in order of decreasing relevance level (step S14). The document retrieving section carries out an output/feedback process with respect to the retrieved document (step S15).

At step S11, in a case that the instructed retrieval is a re-retrieval, the retrieval character string is not changed and only the specification of the highlight level is different from the previous case, the character string retrieving section 15 does not search the database 16. In this case, the relevance level judging section 14 uses the previous temporary retrieval result 25 stored in the memory 22 to thereby carry out the processes of the steps S13 and S14. Here, the temporary retrieval result 25 means the set D of the documents retrieved previously.

In a case of calculating the relevance level at step S13, the highlight level of the character string specified at a time of inputting is converted into the priority level of the character string thereof, and the relevance level of the document is calculated by considering the priority level. Here, since the highlight level is specified by the font size, the relevance level is calculated on the basis of the priority level corresponding to the font size.

For example, let the inputted n retrieval character strings be $s_1, s_2, \ldots, s_n$, and let these respective font sizes be $f_1, f_2, \ldots, f_n$, and let the numbers of the respective character strings included in target documents j (j=1, ..., m) be $c_{j1}, c_{j2}, \ldots, c_{jn}$.

Here, the document j is one of m documents including at least one of the character strings $s_1, s_2, \ldots, s_n$.

Next, let a function from the font size $f_i$ (i=1, ..., n) to the priority level (a real number of [0,1]) be p. For example, in a case of a system which can display a font having a size from a minimum of 8 points to a maximum of 72 points, the equation:

$$p(f_i) = ((f_i - 8)/64)^2 \tag{1}$$

can be used as the function p.

At this time, let a relevance level Rj define a sum of the products of the priority level p ($f_i$) of the respective character strings and the number of character strings $C_{ji}$, then $$Rj = \sum_{i=1}^{n} p(f_i) * c_{ji} \tag{2}$$

The equation (2) represents that the more character strings having a high priority level the document includes, the higher the relevance level.

At step S15, the output section 13 highlights the retrieval character string within a document on the basis of the highlight level specified at a time of inputting, and displays it on the display 28. Also at this time, similarly to the time when the specification is made, it is possible to highlight original text by means of the several font sizes. The feedback specifying section 12 can add feedback information to the documents of the output result by means of an interface similar to that of the input section 11.

Figure 9:
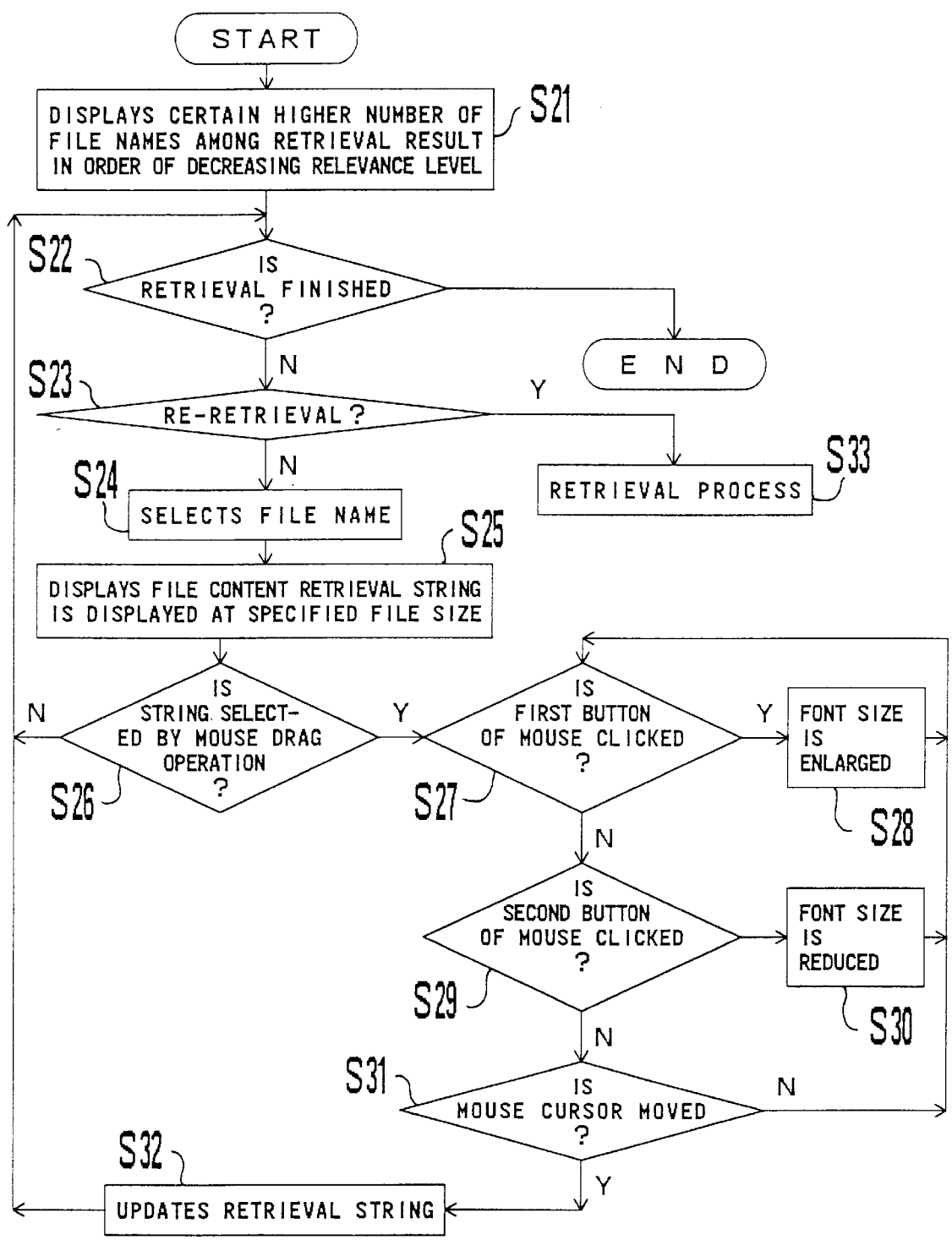
FIG. 9 is a flow chart of an output/feedback process.

FIG. 9 is a flow chart of an output/feedback process at step S15, by means of the output section 13 and the feedback specifying section 12. FIGS. 10, 11, 12, 13, and 14 show examples of screen displays in the output/feedback process. When the process is started in FIG. 9, the output section 13 at first displays file names of a certain number of documents (for example, 50) that are the highest level documents in order of decreasing relevance level (step S21). Next, the output section 13 judges whether or not an instruction of a retrieval finish is inputted by the user (step S22). Unless the finish is indicated, the output section 13 judges whether or not the re-retrieval instruction is inputted (step S23).

When the re-retrieval is not instructed, in a case that the user selects one of the file names on the screen (step S24), the output section 13 displays the content of the document corresponding to the selected file name (step S25). In a case that the user clicks a file name by using the mouse 30 to thereby select a document that he or she wants to read, the content of the file is displayed. At this time, the retrieval character string specified at a time of inputting is highlighted at the font size set at the time of specifying.

Figure 10:
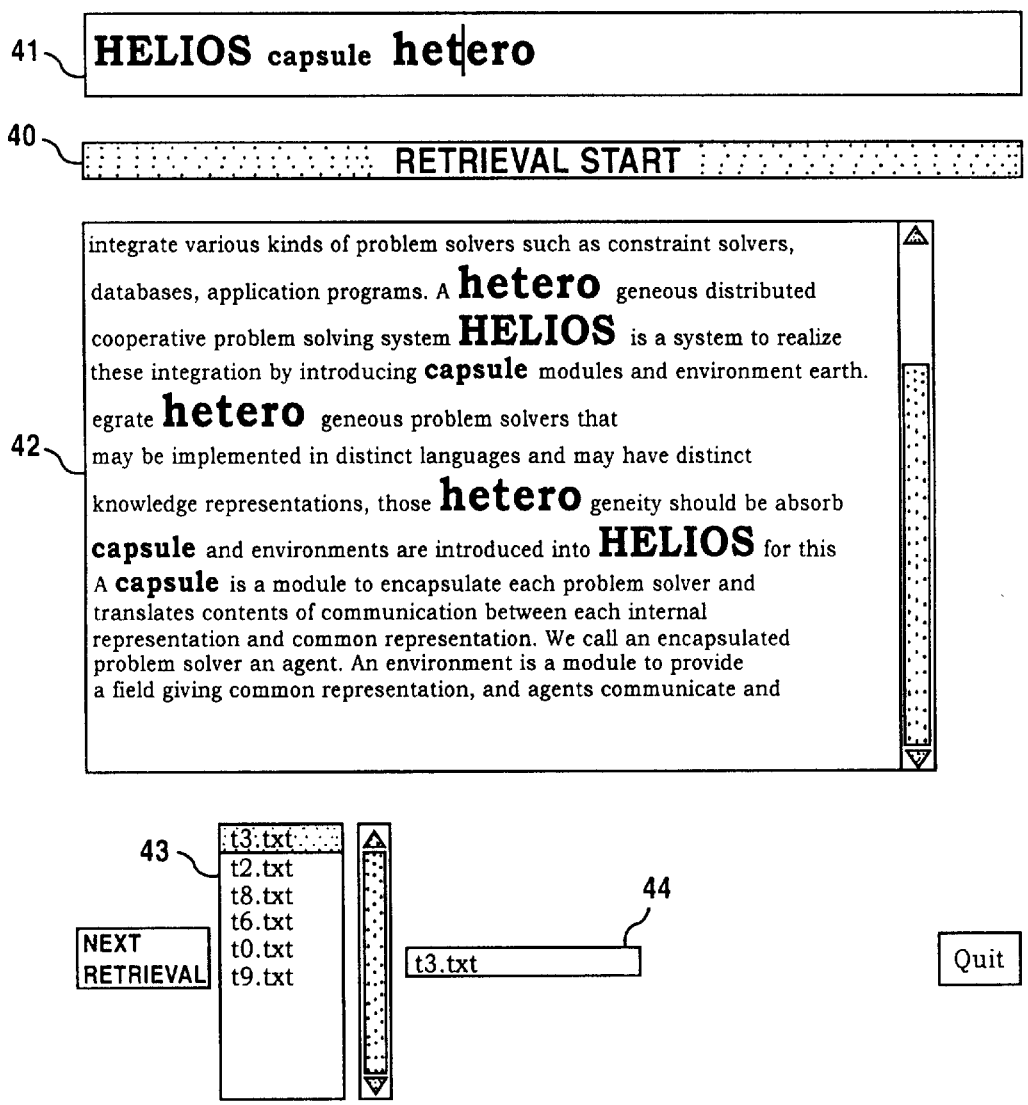
FIG. 10 is a view showing a display screen of a retrieved document.

FIG. 10 shows a display screen of the document obtained by the retrieval operation using the retrieval character string in FIG. 7. In FIG. 10, the highest six file names in the relevance level list are displayed in a window 43. A file name t3.txt selected by the user is displayed in a window 44. A window 42 indicates the content of the file t3.txt.

In the window 42, the retrieval character strings "HELIOS", "capsule" and "hetero" are respectively displayed in the same font size as the characters in the retrieval character string input window 41. Thus, the user can recognize their respective priority levels visually and easily. In a case that the highlight level is specified by means of the other methods, such as the color of a character, the style of type and the like, the display corresponding thereto is carried out in the retrieved result.

Next, the feedback specifying section 12 examines whether or not a particular character string is selected by a dragging operation of the mouse 30, within the displayed document (step S26). Unless the character string is selected, the feedback specifying section 12 returns to the process at step S22 carried out by the output section 13. If the character string is selected, the feedback specifying section 12 judges whether or not the first button 31 of the mouse 30 is clicked (step S27).

Figure 11:
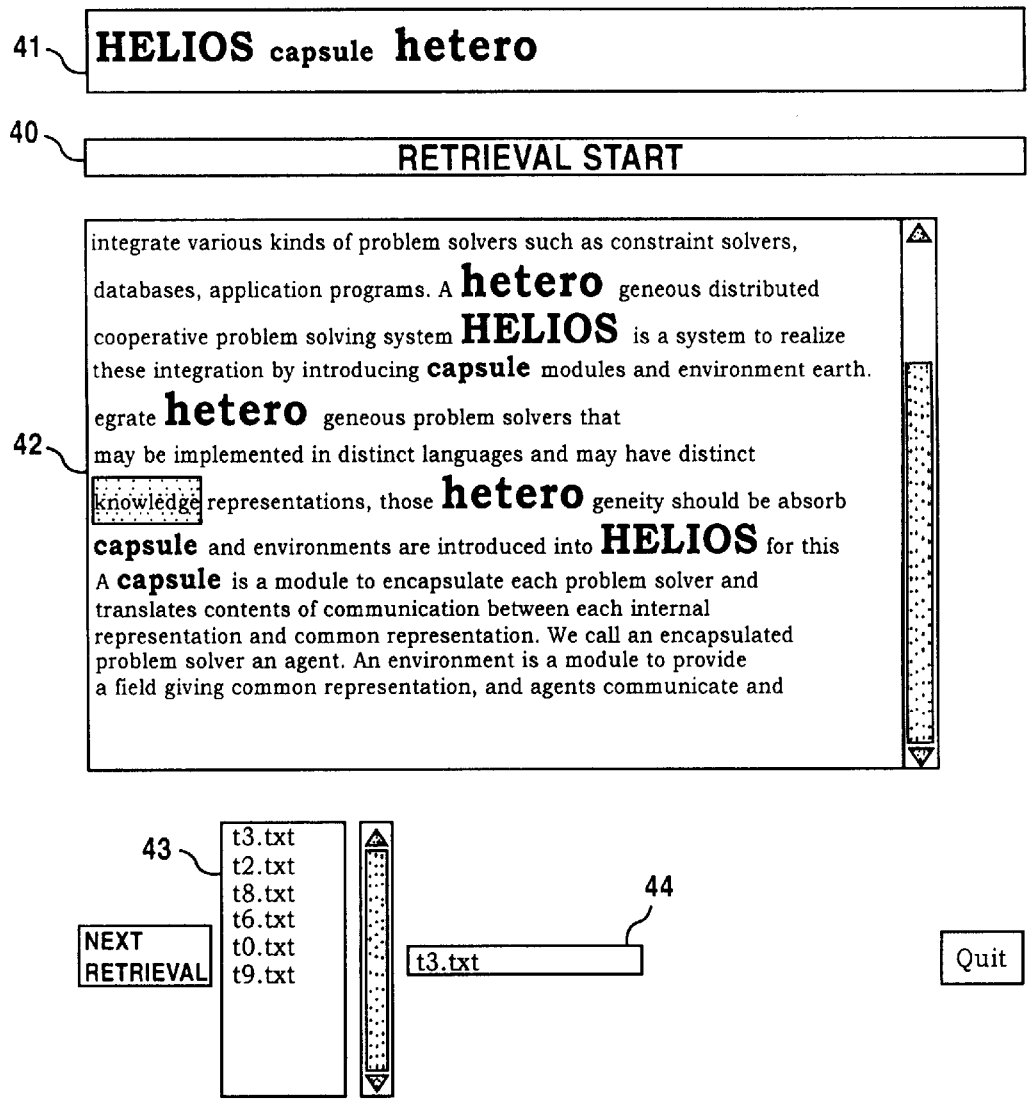
FIG. 11 is a view showing a character string which is newly specified within a document.

FIG. 11 shows an example of the character string specified in the displayed document in FIG. 10. In FIG. 11, "knowledge" is specified which is displayed inverted by the mouse drag operation. It is understood that this is different from the retrieval character string at the time of inputting originally.

In a case that the first button 31 is clicked on the specified character string, the font size thereof is enlarged (step S28), and then the processes on and after step S27 are repeated. Next, the feedback specifying section 12 judges whether or not the second button 32 is clicked (step S29). If the button 32 is clicked, the font size of the character string thereof is reduced (step S30), and the processes on and after step S27 are repeated. The procedure of changing the font sizes at steps S28 and S30 are respectively similar to those at steps S5 and S7 in FIG. 5.

Next, the feedback specifying section 12 judges whether or not a mouse cursor has been moved (step S31). Unless the cursor has been moved, the processes on and after step S27 are repeated. If the mouse cursor has been moved, the character string specified at step S26 is added to the retrieval character string at the specified highlight level, and displayed in the retrieval character string input window 41. In a case that the specified character string was already the retrieval character string, only the highlight level thereof is changed. In this way, the retrieval character string is updated (step S32). The processes on and after step S22 carried out by the output section 13 are repeated.

As mentioned above, it is possible to add a character string within the displayed document as a new retrieval character string while keeping a default highlight level, and further it is possible to change the highlight level of the retrieval character string, by means of the processes at steps S26 to S32 carried out by the feedback specifying section 12. In a case of changing the highlight level of the retrieval character string, it is allowable to select the appropriate character string within the window 41 and also allowable to select the character string within the window 42.

Figure 12:
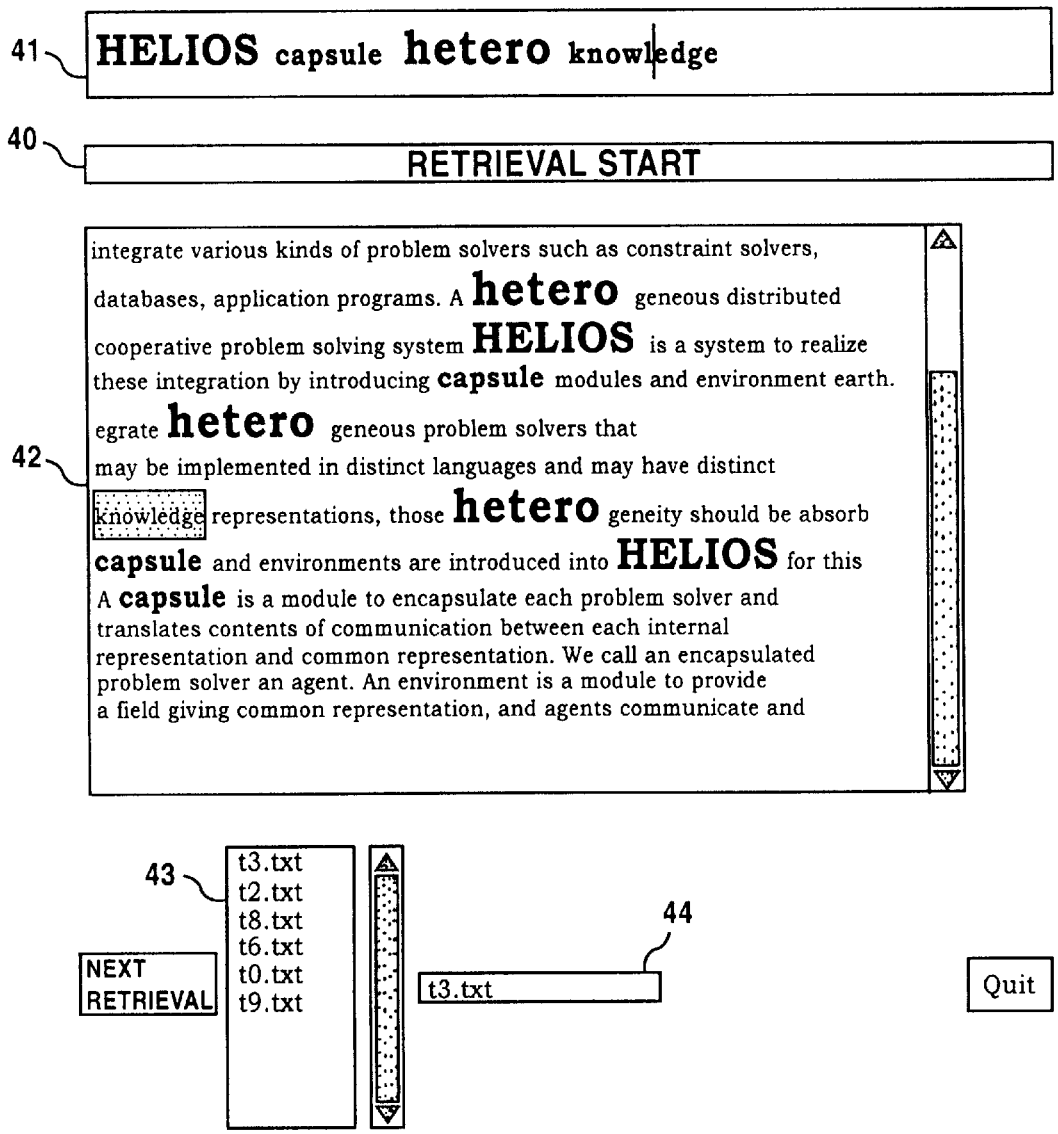
FIG. 12 is a view showing a highlight level of a newly specified character string.

FIG. 12 shows the highlight level of the retrieval character string "knowledge" newly specified in FIG. 11. In FIG. 12, the first button 31 is clicked on the character string "knowledge" added within the window 41, and the font size thereof is enlarged (step S28). Accordingly, "knowledge" within the window 42 is also displayed enlarged.

Figure 13:
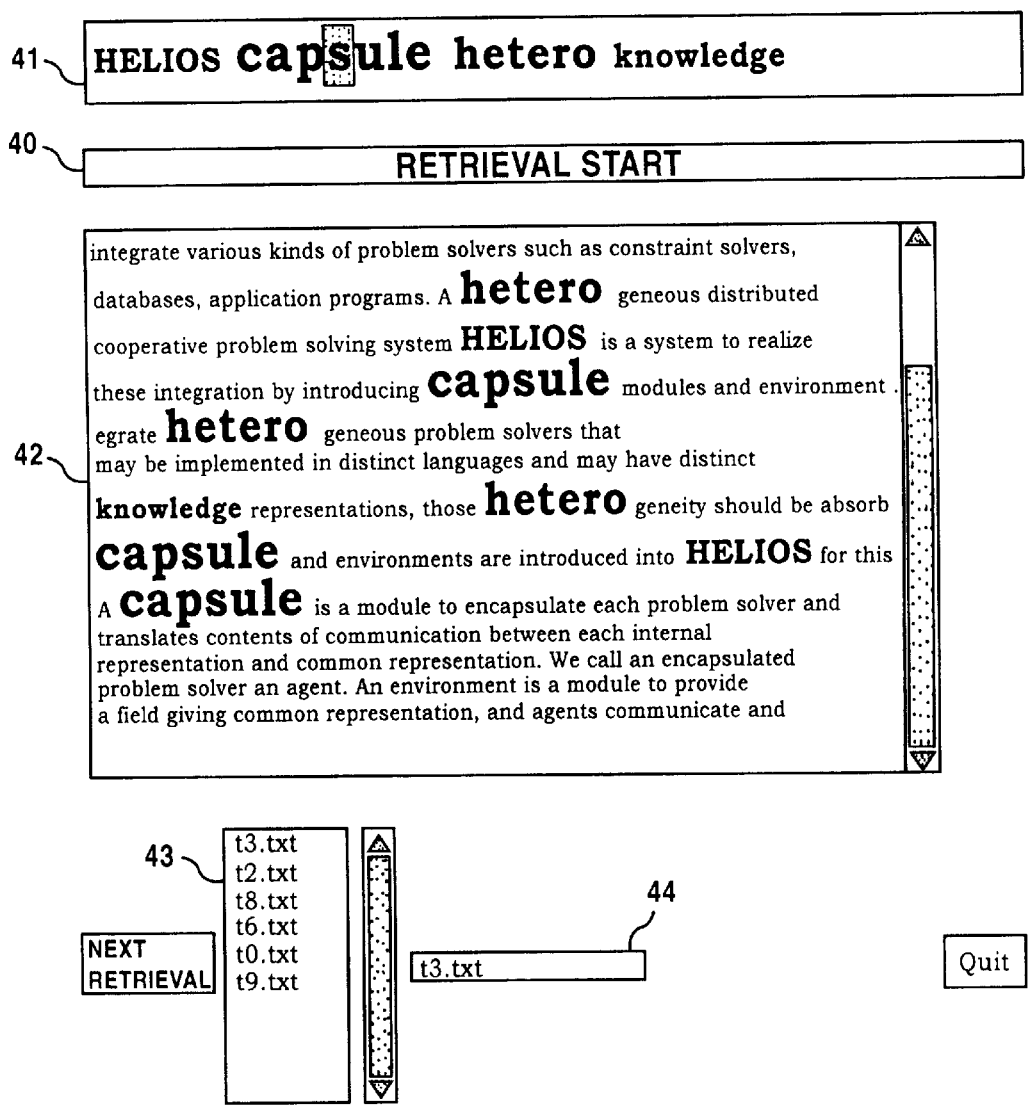
FIG. 13 is a view showing a character string whose highlight level is changed.

FIG. 13 shows an example of an existing retrieval character string whose highlight level is changed. In FIG. 13, the second button 32 is clicked on "HELIOS" and "hetero" among the retrieval character strings first inputted within the window 41, and the font sizes thereof are reduced (step S30). And, the first button 31 is clicked on the character string "capsule", and the font size thereof is enlarged (step S28). Accordingly, "HELIOS" and "hetero" within the window 42 are displayed reduced, and "capsule" is displayed enlarged.

In this way, the retrieval character string within the window 41 is updated (step S32). When the re-retrieval is instructed at step S23, the output section 13 requests the character string retrieving section 15 to carry out the re-retrieval. The character string retrieving section 15 receives this instruction, and again carries out the retrieval process shown in FIG. 8, on the basis of the new retrieval character string after the update (step S33).

Figure 14:
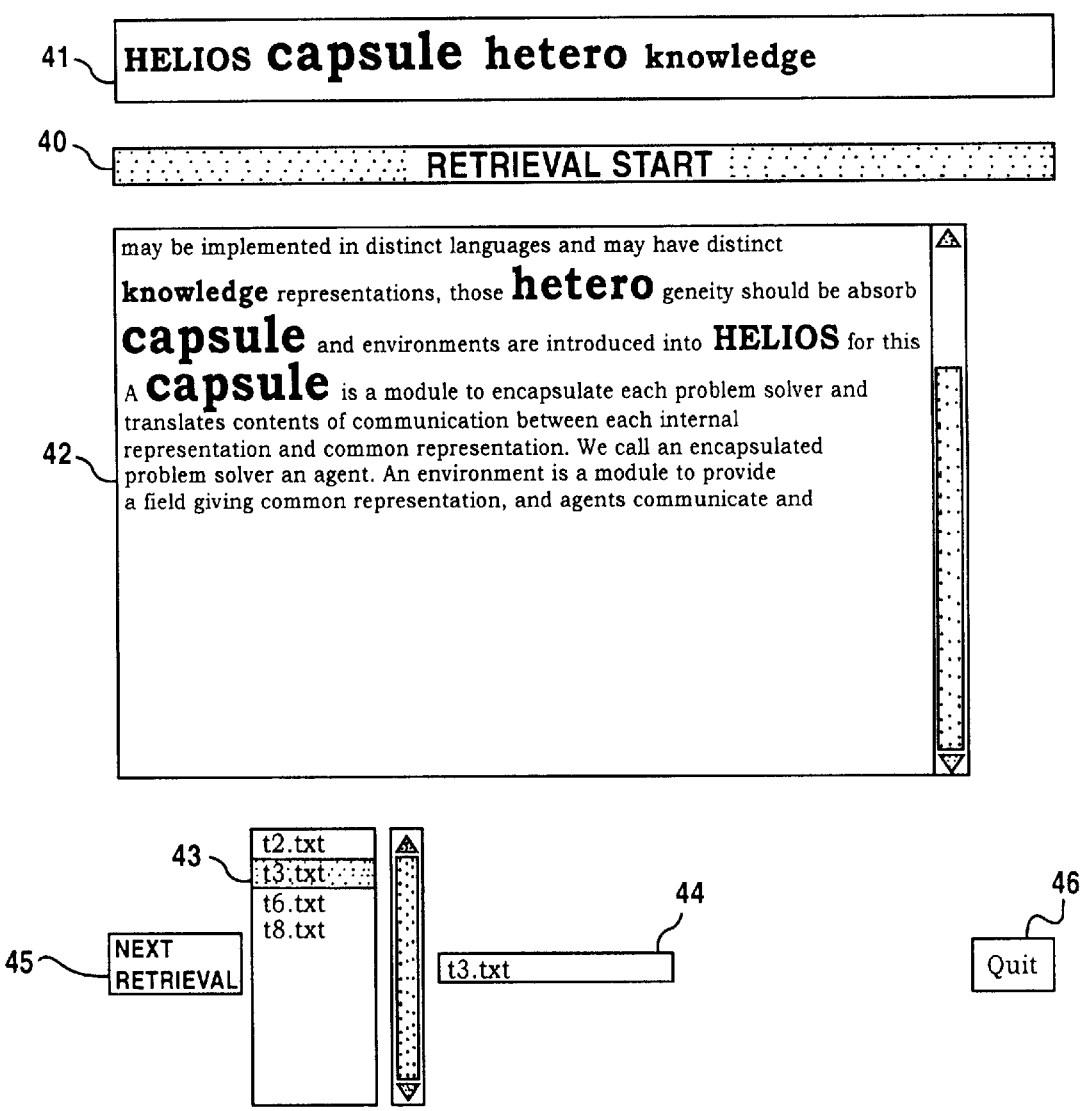
FIG. 14 is a view showing a display screen of a result which is re-retrieved.

FIG. 14 shows a display screen for displaying a result of the re-retrieval carried out on the basis of the retrieval character string shown in FIG. 13. The re-retrieval is carried out by selecting the operation button 40. The highest four file names in the relevance level list are displayed in the window 43 in FIG. 14. It is understood that the display order of these files is different from the case in FIG. 10. The file name t3.txt which the user selects is displayed in the window 44, and the content of t3.txt is displayed in the window 42.

Within the window 42, four retrieval character strings "HELIOS", "capsule", "hetero" and "knowledge" are respectively displayed at the same font size as those of the characters within the window 41.

In this way, the feedback specifying section 12 feeds back the retrieval result outputted by the output section 13 to the character string retrieving section 15. Then, the re-retrieval is carried out by means of the retrieval character string specified by using the first retrieved result. Accordingly, the user can repeat the re-retrieval by using the retrieval result efficiently, and can locate a desired document.

When a retrieval finish is instructed by the user at step S22, the output section 13 finishes the process.

Here, the user can select an operation button 46 on which "Quit" is indicated on the display screen as shown in FIG. 14, to thereby instruct the retrieval finish. Also, if the user selects an operation button 45 on which "Next Retrieval" is indicated, he can erase the displayed content and start a new retrieval. In a case that the operation button 45 is clicked, the input section 11 again starts the input process in FIG. 5, and the document retrieving apparatus carries out a next retrieval.

The document retrieving apparatus according to the present invention can also be used as an interface in a retrieving system in which a weighted Boolean or extended Boolean logic is used. In such a system, after inputting a retrieval expression (logical expression) by means of a logical operator, for example, by suitably selecting the character string by using the mouse 30, the font size of the character string is changed. If using a conversion expression such as the equation (1) to thereby convert the font size into the priority levels from 0 to 1, it is possible to calculate the priority level based on the logical equation. This is similar for cases using a highlight level other than the font size.

The document retrieving apparatus according to the present invention can be also used as a speed-reading support tool for documents. In a case of utilizing a font size as the highlight level, as the priority level of the character string is higher, its font size becomes larger. As a result, text around it is also easy to read. It is possible to quickly check the documents of the retrieval result by reading just the highlighted character strings. This is similar in a case of utilizing highlight levels other than a font size.

According to the present invention, the user can specify the highlight level of the character string using an intuitive graphic user interface, and simply retrieve documents having high relevance levels to an input character string. Even by briefly checking an outputted retrieval result without reading in detail, its importance can be recognized to some degree.

For example, in a case of representing the highlight level of the input character string by the font size, the setting in which the larger the size, the higher the priority level, implements an intuitive interface. As compared with a case of specifying the priority level numerically, it is possible to specify the priority level while visually recognizing the change in the character string on the screen, and thereby an input operation is easy.

Further, the present invention can be also used as an interface for the weighted Boolean retrieval and a speed-reading support tool for documents.

Many widely different embodiments of the present invention may be constructed without departing from the spirit and scope of the present invention. It should be understood that the present invention is not limited to the specific embodiments described in the specification, except as defined in the appended claims.

What is claimed is:

1. A document retrieving apparatus for use in an information processing system for retrieving a document from a text database with a specified string as a retrieval key, comprising:

input means for visually highlighting and inputting at least one retrieval string at a highlighting level;

retrieving means for retrieving a document including said at least one highlighted and inputted retrieval string; and output means for highlighting said at least one retrieval string included in the retrieved document at a highlighting level corresponding to the highlighting level at a time of inputting, and for outputting at least one highlighted retrieval string.

2. A document retrieving apparatus according to claim 1, wherein said output means outputs said highlighted retrieval string at the highlight level specified at the time of inputting.

3. A document retrieving apparatus according to claim 1, wherein said input means comprises a display means for displaying said inputted retrieval string and a pointing means for specifying the appropriate retrieval string displayed by said display means to thereby change the highlight level of the at least one retrieval string.

4. A document retrieving apparatus according to claim 3, wherein said pointing means comprises an operating means for specifying a size of said at least one retrieval string as said highlight level.

5. A document retrieving apparatus for use in an information processing system for retrieving a document from a text database with a specified string as a retrieval key, comprising:

input means for visually highlighting and inputting at least one retrieval string at a highlighting level;

retrieving means for retrieving a document including said at least one highlighted and inputted retrieval string; and relevance level judging means for making the highlighting level of said at least one retrieval string included in the retrieved document correspond to a priority level, and for judging a relation between the at least one retrieval string and the retrieved document using the priority level.

6. A document retrieving apparatus according to claim 5, wherein said relevance level judging means converts the highlight level of said at least one retrieval string into said priority level, uses the priority level to thereby calculate a relevance level of said retrieved document, and preferentially defines a document having a high relevance level as a retrieval result.

7. A document retrieving apparatus for use in an information processing system for retrieving a document from a text database with a specified string as a retrieval key, a document retrieving apparatus comprising:

input means for inputting at least one retrieval string;

retrieving means for retrieving a document including said at least one inputted retrieval string;

output means for outputting a retrieval result; and feedback means for feeding back highlighting level information specified in said outputted retrieval result to said input means so as to retrieve the document again.

8. A document retrieving apparatus according to claim 7, wherein said feedback means comprises a pointing means for specifying any portion of said outputted retrieval result and feeds back a string specified by said pointing means, as a new retrieval string, to said input means.

9. A document retrieving apparatus according to claim 7, wherein said feedback means comprises a pointing means for specifying said at least one retrieval string included in said outputted retrieval result to thereby change the highlight level of said at least one retrieval string and feeds back a highlight level specified by said pointing means to said input means.

10. A document retrieving apparatus according to claim 9, wherein said pointing means comprises an operating means for specifying a size of said at least one retrieval string as said highlight level.

11. A document retrieving apparatus according to claim 7, wherein said input means inputs a new retrieval string based on the information fed back by said feedback means, said retrieving means again retrieves a document including the new retrieval string and said output means outputs a result of the re-retrieval.

12. A document retrieving apparatus according to claim 7, further comprising a relevance level judging means for judging, from a priority level of said at least one retrieval string included in the retrieved document, a relation between the retrieval string and the retrieved document, wherein said output means outputs said retrieval result on the basis of the judgment of the relevance level judging means, said feedback means changes the priority level of the at least one retrieval string to thereby feed back to said input means, said input means inputs a changed priority level, and said relevance level judging means again judges said relation from the changed priority level.

13. A document output apparatus for use in an information processing system, comprising:

input means for inputting at least one string, and output means for highlighting said at least one string by using one of a plurality of highlight levels prepared in advance and for outputting a document including said at least one string.

14. A computer-readable recording medium, when used by a computer which retrieves a document from a text database with a specified string as a retrieval key, used to direct the computer to perform the functions of:

visually highlighting and inputting at least one retrieval string at a highlighting level;

retrieving a document including said at least one highlighted and inputted retrieval string; and highlighting said at least one retrieval string included in the retrieved document at a highlighting level corresponding to the highlighting level at a time of inputting, and for outputting at least one highlighted retrieval string.

15. A computer-readable recording medium, when used by a computer which retrieves a document from a text database with a specified string as a retrieval key, used to direct the computer to perform the functions of:

visually highlighting and inputting at least one retrieval string at a highlighting level;

retrieving a document including said at least one highlighted and inputted retrieval string; and making the highlighting level of said at least one retrieval string included in the retrieved document correspond to a priority level, and for judging a relevance between the at least one retrieval string and the retrieved document using the priority level.

16. A computer-readable recording medium, when used by a computer which retrieves a document from a text database with a specified string as a retrieval key, used to direct the computer to perform the functions of:

inputting at least one retrieval string;

retrieving a document including said at least one inputted retrieval string;

outputting the retrieval result; and using highlighting level information specified in said outputted retrieval result to thereby retrieve the document again.

17. A computer-readable recording medium, when used by a computer, used to direct the computer to perform the functions of:

visually highlighting and inputting at least one string;

highlighting said at least one string by using one of a plurality of highlight levels prepared in advance; and outputting a document including said at least one string.

18. A document retrieving method for retrieving a document from a text database by using an information processing apparatus with a specified string as a retrieval key, comprising the steps of:

visually highlighting and inputting at least one retrieval string at a highlighting level;

retrieving a document including said at least one highlighted and inputted retrieval string; and highlighting said at least one retrieval string included in a retrieved document at a highlighting level corresponding to the highlighting level at a time of inputting, and outputting at least one highlighted retrieval string.

19. A document retrieving method for retrieving a document from a text database by using an information processing apparatus with a specified string as a retrieval key, comprising the steps of:

visually highlighting and inputting at least one retrieval string at a highlighting level;

retrieving a document including said at least one inputted retrieval string; and making said highlighting level of said at least one highlighted and retrieval string included in the retrieved document correspond to a priority level and for judging a relevance between the at least one retrieval string and the retrieved document using the priority level.

20. A document retrieving method for retrieving a document from a text database by using an information processing apparatus with a specified string as a retrieval key, comprising the steps of:

inputting at least one retrieval string;

retrieving a document including said at least one inputted retrieval string:

outputting a retrieval result; and again retrieving the document by using highlighting level information specified in said outputted retrieval result.

21. A document output method for outputting at least one string included in a document within an information processing apparatus by using one of a plurality of highlight levels prepared in advance.

* * * * *